United States Patent [19]
Doering et al.

[11] Patent Number: 5,429,760
[45] Date of Patent: Jul. 4, 1995

[54] REFRIGERANT COMPOSITION CONTAINING TRIFLUOROMETHANE AND 1,1,1,2-TETRAFLUOROETHANE

[75] Inventors: Reinhold Doering, Steinfurt; Hans Buchwald, Ronnenberg; Christoph von Eynatten, Isernhagen, all of Germany

[73] Assignee: Solvay Fluor und Derivate GmbH, Hanover, Germany

[21] Appl. No.: 89,829

[22] Filed: Jul. 12, 1993

[30] Foreign Application Priority Data

Jul. 11, 1992 [DE] Germany .................. 42 22 855.7

[51] Int. Cl.[6] ............................................. C09K 5/04
[52] U.S. Cl. ................................... 252/67; 62/114
[58] Field of Search ......................... 252/67; 62/114

[56] References Cited

FOREIGN PATENT DOCUMENTS

| 430130 | 6/1991 | European Pat. Off. . |
| 0430170 | 6/1991 | European Pat. Off. . |
| 3-170591 | 7/1991 | Japan . |
| 5-032961 | 2/1993 | Japan . |
| 204364 | 4/1993 | Taiwan . |

OTHER PUBLICATIONS

Pannock et al, "Performance of Chlorine-free Binary Zeotropic Refrigerant Mixtures", Chem. Abs. 119((22):228807e, Dec. 1991.

Derwent Abstract of JP 04/096,989, Mar. 1992.

*Primary Examiner*—Christine Skane
*Attorney, Agent, or Firm*—Evenson, McKeown, Edwards & Lenahan

[57] ABSTRACT

Compositions containing trifluoromethane and 1,1,1,2-tetrafluoroethane which are useful as refrigerants in refrigerating machines and air-conditioning systems.

6 Claims, 1 Drawing Sheet

5,429,760

REFRIGERANT COMPOSITION CONTAINING TRIFLUOROMETHANE AND 1,1,1,2-TETRAFLUOROETHANE

BACKGROUND OF THE INVENTION

The present invention relates to novel compositions containing trifluoromethane and 1,1,1,2-tetrafluoroethane which are useful as refrigerants in refrigerating machines and air-conditioning systems.

In air-conditioning systems and refrigerating machines for the medium and low temperature range, the refrigerant chlorodifluoromethane (=R22) has hitherto been used in many cases. For ecological reasons, the use of the refrigerant R22 is now no longer desirable.

SUMMARY OF THE INVENTION

The object of the invention is therefore to provide a suitable refrigerant for such refrigerating machines and air-conditioning systems.

This and other objects of the invention are achieved by providing a refrigerant composition consisting of from 2 to 8% by weight trifluoromethane and from 92 to 98% by weight 1,1,1,2-tetrafluoroethane.

BRIEF DESCRIPTION OF THE DRAWING

The invention will be described in further detail hereinafter with reference to the accompanying drawing in which.

DETAILED DESCRIPTION OF PREFERRED EMBODIMENTS

Figure 1:
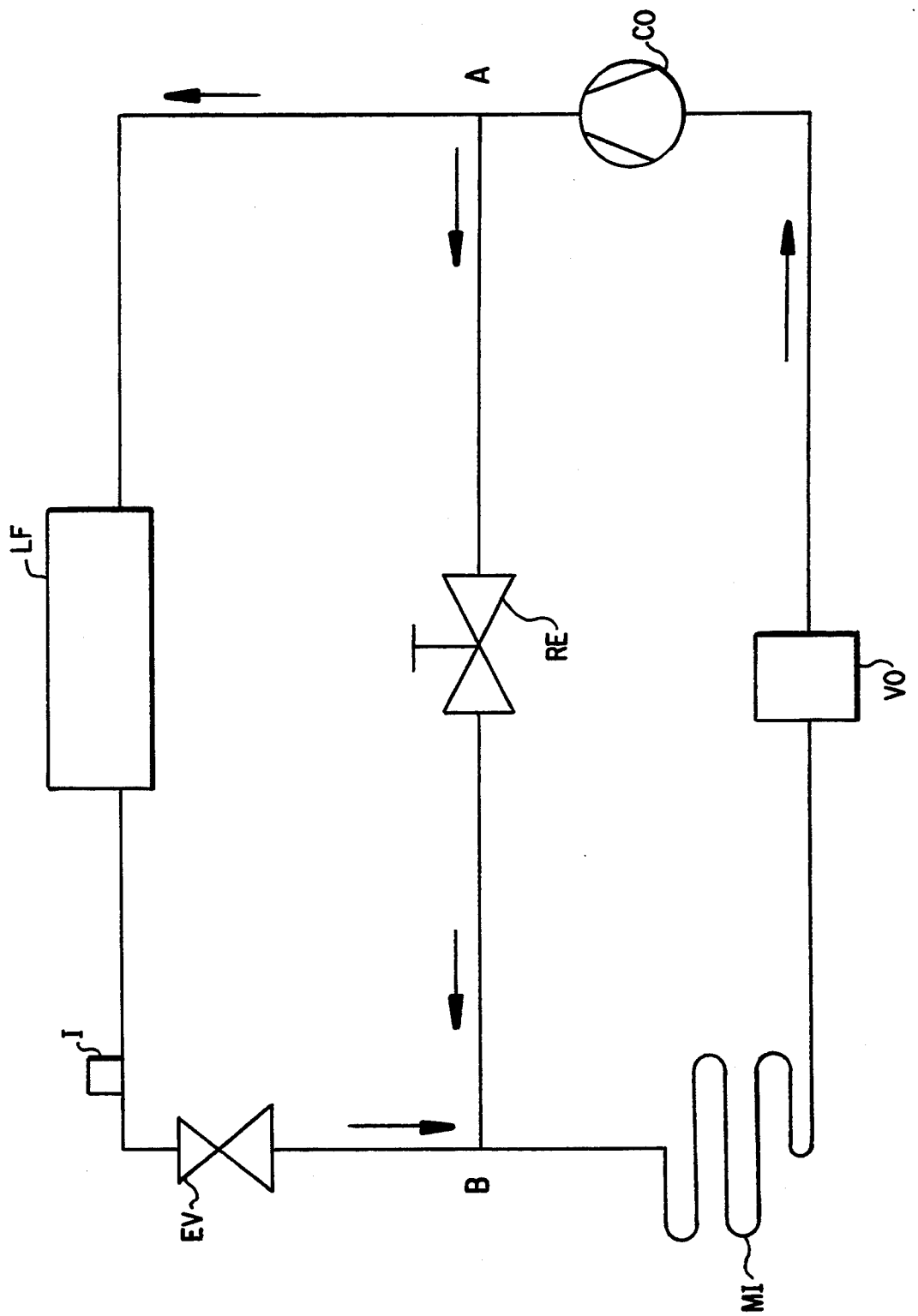
FIG. 1 is a diagram of a compressor test stand (CO: compressor, LF: water-cooled liquefier, RE: restrictor, EV: expansion valve, MI: mixing tube, VO: volume-flow meter, A, B: branching points, I: inlet valve).

Compositions containing trifluoromethane (=R23) and 1,1,1,2-tetrafluoroethane (=R134a) have now been found which are suitable as refrigerants for refrigerating machines and air-conditioning systems.

The invention therefore relates to compositions which are suitable as refrigerants in refrigerating machines and air-conditioning systems and which comprise from 2 to 8% by weight of trifluoromethane (=R23) and from 92 to 98% by weight of 1,1,1,2-tetrafluoroethane (=R134a) and to their use as refrigerants in refrigerating machines and air-conditioning systems. Particularly preferred in this context are compositions containing R23 in an amount from 4 to 6% by weight.

The compositions according to the invention are advantageously suitable, in particular, as refrigerants for the medium and low temperature range with evaporation temperatures ($t_0$) below $-25°$ C., for example as refrigerants for the temperature range with $t_0$ between $-25°$ C. to $-45°$ C. in refrigerating machines such as, for example, upright freezers, chest freezers, cold chambers for aeronautical and scientific purposes or cold chambers for the rapid freezing of food, refrigeration plants for food markets, industrial large-scale refrigeration plants and air-conditioning appliances.

The following examples are intended to illustrate the invention in further detail without limiting its scope.

EXAMPLES

Example 1

Preparation of a Refrigerant Composition From R23 and R134a

A pressure vessel was evacuated using a vacuum pump and then cooled down in a commercially available chest freezer to approximately $-25°$ C. With the aid of a balance, the calculated amount of the higher-boiling component R134a was first metered into the pressure vessel, followed by the lower-boiling component R23. A composition was produced which consisted of 95% by weight of R134a and 5% by weight of R23.

Example 2

Refrigeration Characteristics of a Refrigerant Composition Comprising R23 and R134a Using the refrigerant composition prepared according to Example 1, comprising 5% by weight of R23 and 95% by weight of R134a, tests were carried out on a known type of compressor test stand (manufactured by Copeland) to determine the refrigeration characteristics. The compressor test stand works according to the partial-condensation method and comprises a circulation system which contains a compressor CO, a liquefier LF, a restrictor RE, an inlet valve I, an expansion valve EV, a mixing tube MI and a volume-flow meter VO, connected to one another via conduits. The important stations of the compressor test stand used are shown diagrammatically in FIG. 1.

The pressure vessel containing the refrigerant was connected to the inlet valve, upstream of the expansion valve, of the evacuated compressor test stand. In order to transfer the refrigerant in liquid form into the evacuated refrigeration system, the pressure vessel was reheated to room temperature. The measurements were then carried out at the compressor test stand to determine the refrigeration characteristics according to the partial-condensation method. The measurements were carried out according to the standard specifications DIN 8977 and ISO 917. The method is based on partitioning the refrigerant gas stream leaving the compressor CO at the branching point A into a refrigerant stream to be liquefied and a refrigerant stream to be throttled, which are recombined in point B after the mixture coming from the liquefier LF has been re-expanded via the expansion valve EV. In a mixing tube MI, evaporation of the liquefied refrigerant proportion and mixing with the gas stream coming from the restrictor RE takes place. The data measured are the temperatures and pressures at the inlet into the compressor ($t_{1h}$, $p_0$) and at the outlet from the compressor ($t_{2h}$, $p_c$), the effective volume flow $V_{eff}$ and the rotational speed of the compressor shaft.

The composition according to the invention, which contains R23 and R134a and which forms a non-azeotropic mixture, was additionally subjected in a known manner to p-v-T-x measurements according to the isochor principle. Taking into account the volumetric behavior data, obtained from the p-v-T-x measurements, of the composition according to the invention, and the test results on the compressor test stand, it was possible to determine or calculate, in a known manner via the compilation of the Mollier diagram, the following refrigeration characteristics for the refrigerant composition according to the invention:

| | |
|---|---|
| Evaporation temperature ($t_o$) | $-39.8$ to $-27°$ C. |
| Pressure at the compressor inlet ($p_o$) | 1.05 bar |
| Temperature at the compressor inlet ($t_{1h}$) | 1.82° C. |
| Pressure at the compressor outlet ($p_c$) | 10.60 bar |

| | | |
|---|---|---|
| -continued | | |
| Temperature at the compresser outlet ($t_{2h}$) | | 97.73° C. |
| Liquefaction temperature ($t_c$) | | 38.5 to 25.6° C. |
| Effective refrigerant volume flow ($V_{eff}$) | | 6.37 m³/h |
| Performarice coefficient of the refrigeration process | $\eta_{RE}$ | 2.10 |
| Volumetric efficiency | $\lambda$ | 0.698 |
| Isentropic compression efficiency | $\eta_{is}$ | 0.716 |
| Refrigerating capacity | $Q_o$ | 1.37 kW |
| Pressure ratio | $p_c/p_o$ | 10.1 |
| Refrigerant mass flow | $m_R$ | 29.68 kg/h |

The data determined on the basis of experimental measurements documents the useful refrigeration characteristics of the compositions according to the invention comprising R23 and R134a. Using the refrigerant compositions according to the invention, a high refrigerating capacity and a high performance coefficient are achieved at an acceptable pressure ratio.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A composition useful as a refrigerant in refrigerating machines and air-conditioning systems, consisting of from 2 to 8% by weight trifluoromethane and from 92 to 98% by weight 1,1,1,2-tetrafluoroethane.

2. A composition according to claim 1, which consists of from 4 to 6% by weight trifluoromethane and from 94 to 96% by weight 1,1,1,2-tetrafluoroethane.

3. In a method of refrigeration wherein a refrigerant is circulated between a heat absorbing station and a heat releasing station, the improvement comprising using as said refrigerant a composition consisting of from 2 to 8% by weight trifluoromethane and from 92 to 98% by weight 1,1,1,2-tetrafluoroethane.

4. A method according to claim 3, wherein said refrigerant composition consists of from 4 to 6% by weight trifluoromethane and from 94 to 96% by weight 1,1,1,2-tetrafluoroethane.

5. A method according to claim 3, wherein said heat absorbing station is maintained at a refrigerant evaporation temperature of below −25° C.

6. A method according to claim 5, wherein said heat absorbing station is maintained at a refrigerant evaporation temperature of between −25° C. and −45° C.

* * * * *